United States Patent [19]

Huemke et al.

[11] Patent Number: 5,350,636

[45] Date of Patent: Sep. 27, 1994

[54] SYNTHETIC RESIN

[75] Inventors: Klaus Huemke, Friedelsheim; Dieter Faul, Bad Duerkheim; Gerhard Hoffmann, Otterstadt, all of Fed. Rep. of Germany

[73] Assignee: BASF Lacke+Farben Aktiengesellschaft, Muenster, Fed. Rep. of Germany

[21] Appl. No.: 979,314

[22] Filed: Nov. 20, 1992

[30] Foreign Application Priority Data

Nov. 22, 1991 [DE] Fed. Rep. of Germany ....... 4138384

[51] Int. Cl.⁵ ............................................. B32B 15/08
[52] U.S. Cl. ..................................... 428/418; 523/415
[58] Field of Search ........................ 523/415; 428/418

[56] References Cited

U.S. PATENT DOCUMENTS

| | | | |
|---|---|---|---|
| 3,370,077 | 2/1968 | Hartzell et al. | 260/453 |
| 3,631,199 | 12/1971 | Smith et al. | 260/453 |
| 4,148,819 | 4/1979 | Watts, Jr. et al. | 260/453 |

FOREIGN PATENT DOCUMENTS 0303182  2/1989  European Pat. Off. .

*Primary Examiner*—Melvyn I. Marquis
*Assistant Examiner*—D. Aylward
*Attorney, Agent, or Firm*—Keil & Weinkauf

[57] ABSTRACT

A synthetic resin contains, as essential components,

A) a crosslinkable binder selected from the group consisting of the polymers, polyadducts or polycondensates having reactive centers in the form of hydroxyl, thio or primary or secondary amino groups and B) a crosslinking agent based on at least one polyoxyalkylene polyisocyanate and C) a crosslinking agent which differs from (B) and is based on $\gamma_1$) a polyfunctional isocyanate which differs from (B) or $\gamma_2$) an organic compound which reacts at elevated temperatures with free amino groups of component (A) with amide formation or $\gamma_3$) an organic compound which reacts at elevated temperatures with hydroxyl groups of component (A) with transesterification or $\gamma_4$) a phenolic Mannich base or a mixture of two or more crosslinking agents ($\gamma_1$) to ($\gamma_4$).

10 Claims, No Drawings

SYNTHETIC RESIN

The present invention relates to synthetic resins which contain, as essential components, A) a crosslinkable binder selected from the group consisting of the polymers, polyadducts or polycondensates having reactive centers in the form of hydroxyl, thio or primary or secondary amino groups, B) a crosslinking agent based on a polyoxyalkylene polyisocyanate and C) a crosslinking agent which differs from (B) and is based on $\gamma_1$) a polyfunctional isocyanate which differs from (B) or $\gamma_2$) an organic compound which reacts at elevated temperatures with free amino groups of component (A) with amide formation or $\gamma_3$) an organic compound which reacts at elevated temperatures with hydroxyl groups of component (A) with transesterification or $\gamma_4$) a phenolic Mannich base or a mixture of two or more crosslinking agents ($\gamma_1$) to ($\gamma_4$).

The present invention furthermore relates to aqueous dispersions which contain such synthetic resins and to the use of the aqueous dispersions in electrocoating baths.

The cathodic electrocoating method is being used more and more frequently for coating metal parts, particularly in the automotive industry. The cathodic synthetic resins required provide good corrosion protection and at the same time have high impact strength so that, for example, automotive finishes are not damaged by impacts by, for example, stone chips or stone chip/salt mixtures from road gritting in the winter.

EP-B1-70 550 describes aqueous dispersions for cathodic electrocoating, in which synthetic resins which are obtainable by reacting epoxy resins based on bisphenol A with polyoxyalkylenepolyamines are used as binders.

However, the systems known to date do not yet meet all requirements with regard to excellent stone chip resistance in conjunction with good corrosion protection while retaining all their other good performance characteristics.

It is an object of the present invention to provide synthetic resins which are suitable as coating materials and have both high stone chip resistance and very good corrosion resistance.

We have found that this object is achieved by the synthetic resins defined at the outset.

Component A

According to the invention, the synthetic resins contain a crosslinkable binder. The binder content is preferably from 50 to 95% by weight.

The basic building blocks of the binders which are suitable as component A are polymers, polycondensates or polyadducts which contain reactive centers in the form of hydroxyl, thio or primary or secondary amino groups. Via these reactive centers, the binders may, for example, become water-dispersible as a result of protonation or be crosslinked by reaction with the components (B) and (C). The average molecular weight $\overline{M}_w$ of the basic building blocks is in general from 200 to 5,000, preferably from 250 to 3,000, the content of reactive centers being in general from 1.5 to 3.0, preferably from 1.8 to 2.5, equivalents per molecule. Examples of suitable materials are polyesters, alkyd resins, polyethers, polyacrylates, polyurethanes and polyepoxides. These basic building blocks may additionally be reacted with amines, alcohols, thiols or mixtures of these compounds.

Suitable polyesters are those of aliphatic and/or aromatic dicarboxylic acids of 4 to 10 carbon atoms and polyhydric alcohols or thiols. Examples of dicarboxylic acids are succinic acid, glutaric acid, adipic acid, pimelic acid, suberic acid, azelaic acid, sebacic acid, cyclohexanedicarboxylic acid, phthalic acid, isophthalic acid or terephthalic acid or derivatives of these dicarboxylic acids. The polyhydric alcohols include aliphatic diols, such as ethylene glycol, diethylene glycol, triethylene glycol, polyethylene glycol, propanediol, butanediol, hexanediol, neopentylglycol and neopentylglycol hydroxypivalate, and alcohols having a higher functionality, such as trimethylolpropane, glycerol, erythritol, pentaerythritol, trimethylolbenzene or trishydroxyethyl isocyanurate.

Suitable alkyd resins have a similar composition but additionally contain one or more monocarboxylic acids, for example fatty acids. Alkyd resins which contain glycidyl esters of branched carboxylic acids may also be used.

Aliphatic or araliphatic polyethers having reactive centers may likewise be used. They can advantageously be obtained by reacting di- and/or polyhydric alcohols with ethylene oxide and/or propylene oxide.

The group consisting of the polymers includes polyacrylates which can be prepared by copolymerizing from 5 to 50, preferably from 10 to 30, % by weight of a hydroxyl- or amino-containing monomer or of a mixture of different monomers of this type with from 0 to 95, preferably from 70 to 90, % by weight of other unsaturated monomers. The first-mentioned group of monomers includes, for example, isopropylaminopropylmethacrylamide and hydroxy- $C_2$–$C_4$-alkyl esters of an $\alpha, \beta$-ethylenically unsaturated carboxylic acid, for example 2-hydroxyethyl and hydroxypropyl methacrylate, and butanediol monomethacrylate. The last-mentioned group of monomers includes, for example, vinylaromatics, such as styrene and vinyltoluene, vinyl esters of carboxylic acids of 2 to 18 carbon atoms, e.g. vinyl acetate and vinyl propionate, vinyl ethers of monoalcohols of 1 to 18 carbon atoms, such as vinyl methyl ether and vinyl isobutyl ether, esters of acrylic acid and methacrylic acid with $C_1$–$C_{12}$-monoalcohols, corresponding diesters of maleic acid, of fumaric acid and of itaconic acid, acrylamide, acrylonitrile and the corresponding methacrylic acid derivatives and mixtures of these monomers. It is also possible to polymerize epoxide-carrying acrylates, such as glycidyl methacrylate, and to derivatize the polymers by reaction with amines.

Polycondensates which may be used are, for example, condensates of polycarboxylic acids with polyamines. Reaction products of dimerized or trimerized fatty acids and polyamines, such as ethylenediamine, 1,2-and 1,3-diaminopropane, diethylenetriamine, dipropylenetriamine and triethylenetetramine, are suitable provided that they contain the required reactive centers.

Polyurethanes of aliphatic and/or aromatic diisocyanates and aliphatic diols have likewise proven suitable provided that they have the required reactive centers. Examples of the diisocyanates are tetramethylene diisocyanate, hexamethylene diisocyanate, isophorone diisocyanate, diphenylmethane diisocyanate, toluylene diisocyanate, naphthylene diisocyanate and 4,4'-diisocyanatodiphenyl ether. Examples of suitable diols are ethylene glycol, diethylene glycol, triethylene glycol, polyethylene glycol, propanediol, butanediol, hexanediol, neopentylglycol and neopentylglycol hydroxypivalate. However, alcohols having higher functionalities, such as trimethylolpropane, glycerol, pentaerythritol, triethylolbenzene and trishydroxethyl isocyanurate, are also suitable.

Preferred binders are those whose basic structure is based on epoxy resins.

Epoxy resins which are reaction products of a polyhydric phenol with epihalohydrin may be used, and the molecular weight may be controlled by means of the ratio of phenol to epihalohydrin. Examples of such polyhydric phenols are resorcinol, hydroquinone, 2,2-di-(4-hydroxyphenol)-propane (bisphenol A), p,p'-dihydroxybenzophenone, p,p'-dihydroxybiphenyl, 1,1-di-(4-hydroxyphenyl)-ethane, bis-(2-hydroxynaphthyl)-methane, 1,5-dihydroxynaphthylene and novolaks. Bisphenol A is preferably used. The preferred epihalohydrin is epichlorohydrin.

In addition to epoxy resins of a polyhydric phenol and an epihalohydrin, it is possible to use polyglycidyl ethers of polyhydric alcohols, such as ethylene glycol, diethylene glycol, triethylene glycol, 1,2-propylene glycol, 1,3-propanediol, 1,4-butanediol, 1,5-pentanediol, 1,6-hexanediol, 1,2,6-hexanetriol, glycerol or 2,2-bis-(4-hydroxycyclohexyl)-propane.

It is very particularly preferable if epoxy resins which are diglycidyl ethers of bisphenol A are modified with polyhydric phenols, in particular bisphenol A.

According to the invention, the epoxy resin can be reacted with an amine or a mixture of different amines. The amines include alkylamines, alkylalkanolamines, polyoxyalkylenepolymines and polyamines of polyolefins. Suitable products can be obtained, for example, by reaction with an excess of primary alkyldiamines whose alkyl radical may be of 2 to 20 carbon atoms. Particularly suitable primary alkyldiamines are ethylenediamine, 1,2- and 1,3-diaminopropane, 1,4-diaminobutane, neopentanediamine and hexamethlenediamine. Suitable secondary dialkylmonoamines are those whose alkyl radicals are of 1 to 20 carbon atoms, dimethylamine and diethylamine being preferred. Alkylalkanolamines whose alkyl and alkanol radicals may each be of 1 to 20 carbon atoms are also suitable, and the chain lengths of the radicals may be either identical to or different from one another. Examples of alkylalkanolamines are ethylethanolamine, methylisopropanolamine and in particular methylethanolamine. The polyoxyalkylenepolyamines which may be used are, for example, polyoxyethylenepolyamine, polyoxypropylenepolyamine and polyoxybutylenepolyamine. The polyamines of polyolefins include amino-terminated butadiene/acrylonitrile copolymers.

A further possible method of modifying the epoxy resins is to react them with secondary amines which contain block primary amino groups. Only the secondary amino groups react with the epoxy resin, while the block primary amino groups can be liberated after the reaction, for example by adding water. The alkyl radicals of these compounds are in general of from 1 to 20 carbon atoms. Examples of such amines are the diketimine of diethylenetriamine, the ketimine of aminoethylethanolamine, the ketimine of N-methylethylenediamine and the ketimine of N-aminoethylpiperazine. A preferred ketimine is methyl isobutyl ketimine.

If desired, the amine-modified epoxy resin may be subjected to a chain-extending reaction with dicarboxylic acids, for example with sebacic acid or a dimeric fatty acid. Monocarboxylic acids, such as stearic acid or fatty acids, may also be used.

According to the invention, diglycidyl ethers based on a polyhydric phenol, in particular based on bisphenol A and epichlorohydrin, are preferred binders. The average molecular weights $\overline{M}_w$ of these compounds are as a rule from 200 to 5,000, and they contain on average from about 1.5 to 3.0 epoxy groups per molecule, corresponding to epoxide equivalent weights of from about 50 to 1,000. Epoxy equivalent weights of from about 150 to 1,500, in particular from about 400 to 500, are preferred. It has proven particularly advantageous to modify these epoxy resins with amines, dimethylaminopropylamine and methylethanolamine being particularly suitable.

Component B

Synthetic resins contain, as component B, in general from 5 to 50, in particular from 10 to 30, % by weight of a crosslinking agent based on a polyoxyalkylene polyisocyanate.

Polyoxyalkylene polyisocyanates which contain a very high proportion of polyoxyalkylene diisocyanate are preferred for avoiding premature crosslinking. Accordingly, preferred polyoxyalkylene polyisocyanates are those of the general formula I

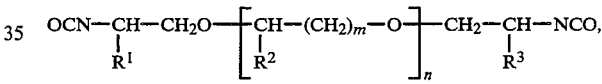

where $R^1$ to $R^3$ may be identical or different and are each hydrogen or $C_1$-$C_6$-alkyl, m is from 1 to 10, preferably from 1 to 3. The chain length n is from 1 to 50, preferably from 1 to 30. In general, polyoxyalkylene polyisocyanates having average molecular weights $\overline{M}_w$ of from 450 to 2,500 are particularly desirable, but those having average molecular weights of from 400 to 3,000 may also be suitable. Polyoxyalkylene polyisocyanates having an $\overline{M}_w$ outside the range from 200 to 3,800 generally have no advantages. Particularly preferred polyoxyalkylene polyisocyanates are polyoxyethylene polyisocyanate, polyoxypropylene polyisocyanate and polyoxybutylene polyisocyanate.

The polyoxyalkylene polyisocyanates can be prepared, for example, from the corresponding amines by reaction with phosgene by methods known from the literature (cf. for example Houben-Weyl, Methoden der Organischen Chemie; Editor H. Hagemann; Vol. E4, page 741 et seq., Georg-Thieme-Verlag, Stuttgart, 1983).

According to the invention, the isocyanate groups of the crosslinking component (B) may be blocked, for example, by means of ketoximes and/or polyols, including both polyhydric aliphatic alcohols and aromatic polyols.

The polyoxyalkylene polyisocyanates are generally reacted with an amount of ketoxime such that the ratio of the number of equivalents of NCO to the number of equivalents of N—OH is from 3:1 to 1.5:1, preferably from 2.5:1 to 1.5:1. The remaining isocyanate groups can be blocked with polyols and/or reacted with secondary amines and/or alkanolamines.

In the reaction of the polyoxyalkylene polyisocyanates with polyols, the amounts are preferably chosen so that the ratio of the number of equivalents of NCO to the number of equivalents of OH is in general from 1.1:1 to 1.8:1, preferably from 1.2:1 to 1.7:1. Ratios of numbers of equivalents which are less than 1.1:1 generally result in the compounds gelling and thus having too low a viscosity. An excess of NCO greater than 1.8:1 results in molecules having molecular weights which are too low for most applications. The remaining isocyanate groups are reacted with secondary amines and/or with alkanolamines in a second reaction step.

It is also possible to block the polyoxyalkylene polyisocyanates so as to form n a crosslinking agent which acts at different temperatures. Thus, some of the isocyanate groups may be blocked, for example in a first reaction step, with an alcohol, such as dimethylaminopropanol and ethanol, and in a second reaction step with a polyol which has phenolic terminal groups. These phenolic terminal groups can then be reacted with formaldehyde and a secondary amine so that a crosslinking agent having an isocyanate function (higher temperature) and a transamination function (lower temperature) can be obtained.

Suitable ketoximes are dialkylketoximes whose alkyl radicals are of 1 to 6 carbon atoms, may be identical to or different from one another and are linear, branched or cyclic. Examples are dimethyl ketoxime, methyl ethyl ketoxime, diethyl ketoxime, methyl propyl ketoxime, dipropyl ketoxime, methyl butyl ketoxime, dibutyl ketoxime, methyl pentyl ketoxime and methyl hexyl ketoxime. Methyl isobutyl ketoxime is particularly preferably used.

The polyols which may be used as blocking agents include aliphatic diols, such as diethylene glycol, 1,4-butanediol, 1,5-pentanediol, polyethylene glycol and polypropylene glycol. Aromatic polyols whose average molecular weights are from 200 to 5,000, in particular from 200 to 2,000 and which carry on average at least 2 hydroxyl groups in the molecule are preferably used. Reaction products of bisphenol A with epoxy resins have proven particularly suitable, epoxy resins based on bisphenol A and an epihalohydrin being preferred.

Component C

The crosslinking agent which is present according to the invention as component (C) in general in an amount of from 5 to 50, preferably from 10 to 30, % by weight in the synthetic resin may be a blocked isocyanate crosslinking agent which differs from crosslinking agent (B) or may be a transesterification, transamidation or transamination crosslinking agent. However, mixtures of different crosslinking agents may also be used. Crosslinking agent (C) may be a separate component of the synthetic resin. However, the molecules of the crosslinking agents may also be linked to the binder (A). Crosslinking of the self-crosslinking binders takes place only when required, as a result of suitable conditions having beer established.

Examples of suitable blocked isocyanate crosslinking agents are toluylene diisocyanate, diphenylmethane 4,4'-diisocyanate, isophorone diisocyanate, trimerized hexamethylene diisocyanate and triphenylmethane triisocyanate. Among these, toluylene diisocyanate, diphenylmethane 4,4'-diisocyanate and isophorone diisocyanate are particularly preferred. They may be blocked, for example with the abovementioned (cf. component (B)) polyols.

Compounds which form transamidation crosslinking agents are compounds, preferably polyester resins, which contain free carboxyl groups capable of undergoing an addition reaction with carbalkoxymethyl groups. The carbalkoxymethyl esters react with free primary and/or secondary amino groups of the binders with amide formation.

The binders which have hydroxyl groups as reactive centers can be cured, for example, by transesterification crosslinking agents. These crosslinking agents can be prepared, for example, by reacting epoxy resins based on bisphenol A and an epihalohydrin with a dicarboxylic acid in a first reaction step. In a second reaction step, these polyepoxide/dicarboxylic acid adducts can be reacted, for example, with glycolic esters, for example methyl glycolate, or with alkylene oxides, such as ethylene oxide or propylene oxide, or glycidyl esters of branched aliphatic carboxylic acids, in particular glycidyl Versatate.

Mannich bases which are reaction products of phenols, formaldehyde and secondary amines can likewise be used as crosslinking components (C). For the preparation of these transamination crosslinking agents, for example, epoxy-carrying compounds, such as polyoxypropylene diglycidyl ethers, are reacted with polyhydric phenols, such as bisphenol A, and then with dialkylamines, such as dimethylamine, diethylamine or piperidine, and with formaldehyde or compounds which donate formaldehyde. Additional hydroxyl, thiol and/or amino groups can be introduced into the abovementioned crosslinking agents by appropriate reactions.

Component D

If desired, pigment formulations may be added to the synthetic resins. Thus, the synthetic resins may preferably contain from 0 to 30% by weight of a pigment formulation of one or more pigments and a resin having surfactant properties, i.e. a grinding resin.

Conventional pigments are, for example, iron oxides, lead oxides, strontium carbonate, carbon black, titanium dioxide, talc, barium sulfate, cadmium yellow, cadmium red, chromium yellow, phthalocyanine blue or metallic pigments, such as aluminum flakes.

The resins of the formulation should have a high pigment-carrying capacity and should be compatible with the particular binder of the synthetic resin. Preferred grinding resins contain diglycidyl ethers which are based on bisphenol A and an epihalohydrin and are modified with an amine, in particular hexamethylenediamine.

Component E

In addition, the novel synthetic resins may contain one or more additives, preferably various fillers, antioxidants, UV absorbers, leveling agents, antifoams and other additives, for example polyvinyl ethers. These materials generally account for from 0 to about 10, in particular from 0.5 to 5, % by weight of the synthetic resin. The preferred fillers include titanium dioxide and barium titanium oxides. Benzotriazoles and oxalic acid anilides have proven particularly good UV absorbers. Butylglycol and propylene glycol phenyl ether are examples of leveling agents. Examples of antifoams are fatty esters of butyne-1,4-diol and naphthenic mineral oils.

The individual components of the synthetic resin may each be present in solution in an organic solvent. Suitable solvents are aromatic hydrocarbons, such as toluene and xylene, glycols, glycol ethers, such as diethylene glycol methyl ether, and alcohols.

The synthetic resin, in the form of a mixture of the components or of the solutions thereof, can be used as a coating material for various substrates.

By adding acids, preferably carboxylic acid, such as formic, acetic or lactic acid, as well as inorganic acids, e.g. phosphoric acid, the synthetic resins can be dispersed in water and applied by conventional methods to substrates of wood, plastic or metal. However, it is preferable to protonate the components separately, to disperse them separately in water, to strip off the organic solvent if desired and then to mix the individual dispersions. It is of course also possible to add the additives to each of the individual components and then to carry out dispersing.

The novel synthetic resins are suitable, in the form of aqueous dispersions, for the electrocoating of electrically conductive articles, such as metal parts. For cathodic electrocoating, the solids content of the electrocoating bath is generally brought to 5–40, preferably 10–30, % by weight. Deposition is usually effected at from 15° to 40° C., preferably from 20° to 35° C., in the course of from 1 to 5 minutes at a pH of from 5 to 8, preferably at the neutral point, at voltages of from 50 to 500 V, preferably from 150 to 450 V. The electrically conductive article to be coated is made the cathode. The deposited film is cured at from about 100° to about 200° C. for from about 10 to about 30 minutes.

The coatings obtainable using the novel synthetic resins have very good stone chip resistance in conjunction with very good corrosion protection. Moreover, they have a long shelf life since their individual components have been separately dispersed.

| | Abbreviations |
|---|---|
| [1]BPA: | Bisphenol A (p,p'-dihydroxyphenylpropane) |
| [2]EEW: | Epoxide equivalent weight |
| [3]MiBK: | Methyl isobutyl ketone |
| [4]NCO-EW: | Isocyanate equivalent weight |
| [5]DE: | Demineralized |

| % by weight | Equivalent | Component |
|---|---|---|
| | | Synthetic resin 1 |
| | | (A): Binder 1 |
| 50.4 | 3.74 | Diglycidyl ether based on BPA[1], EEW[2] = 188 |
| 18.6 | 1.0 | Polycaprolactonediol, $\overline{M}_w \sim 540$ |
| 2.5 | — | Xylene |
| 13.7 | 1.74 | BPA |
| 0.3 | — | Benzyldimethylamine |
| 5.1 | 0.61 | Diethylenetriamine - MiBK[3] - diketimine, 75% strength in MiBK |
| 4.1 | 0.79 | Methylethanolamine |
| 5.3 | — | 2-Hexyloxyethanol |
| | | (B): Crosslinking agent B1 |
| 53.9 | 2.4 | Polyoxybutylene polyisocyanate, $\overline{M}_w \sim 480$, NCO-EW[4] = 240 |
| 10.8 | — | Diethylene glycol dimethyl ether |
| 21.4 | 2.0 | BPA |
| 6.4 | — | Toluene |
| 7.5 | 0.79 | Dipropylamine |
| | | (C): Crosslinking agent C1 |
| 36.1 | 2.0 | Toluylene diisocyanate |
| 24.5 | 1.0 | Butylglycol |
| 9.4 | 1.0 | Trimethylolpropane |
| 30.0 | — | MiBK |
| | | Synthetic resin 2 |
| | | (A): Binder 2 (self-crosslinking) |
| 22.6 | 2.0 | Diglycidyl ether based on BPA, EEW $\sim 260$ |
| 20.2 | — | Monoethylene glycol monoethyl ether acetate |
| 0.01 | — | Hydroquinone |
| 14.8 | 2.0 | Tetrahydrophthalic acid |
| 10.0 | 1.0 | Hydroxyethyl methacrylate |
| 15.1 | 4.0 | Toluylene diisocyanate |
| 7.7 | 2.0 | Dimethylethanolamine |
| 9.6 | — | Ethyl acetate |
| | | (B): Crosslinking agent B2 |
| 10.2 | 8.0 | Diglycidyl ether based on BPA, EEW = 188 |
| 14.8 | 19.2 | BPA |
| 0.01 | — | Triphenylphosphine |
| 14.1 | — | MiBK |
| 48.6 | 13.0 | Polyoxypropylene polyisocyanate, $\overline{M}_w \sim 1100$, NCO-EW $\sim 550$ |
| 10.7 | — | Diethylene glycol dimethyl ether |
| 1.6 | 2.7 | Dimethylethanolamine |
| | | Synthetic resin 3 |
| | | (A): Binder 3 |
| 5.9 | 9.3 | Hexamethylenediamine |
| 7.3 | 2.4 | Dimeric fatty acid, $\overline{M}_w \sim 560$ |
| 1.4 | 0.45 | Linoleic acid, $\overline{M}_w \sim 280$ |
| 16.9 | — | Toluene |
| 52.6 | 10.0 | Diglycidyl ether based on BPA, EEW $\sim 485$ |
| 12.7 | — | Isobutanol |
| 3.2 | 4.0 | Methylethanolamine |
| | | (B): Crosslinking agent B3 |
| 73.9 | 0.75 | Polyoxybutylene polyisocyanate, $\overline{M}_w \sim 2000$, NCO-EW $\sim 1000$ |
| 19.7 | — | Xylene |
| 4.5 | 0.39 | BPA |
| 1.9 | 0.15 | Diisobutylamine |
| | | (C): Crosslinking agent C2 |
| 47.9 | 1 | Hexamethylene diisocyanate (trimeric) |
| 20.0 | — | MiBK |
| 32.1 | 1 | Dibutylamine |
| | | Synthetic resin 4 |
| | | (A): Binder 3 |
| 51.2 | 10.15 | Diglycidyl ether based on BPA, EEW = 188 |
| 17.8 | 2.7 | BPA/ethylene oxide adduct (molar ratio 1:6), $\overline{M}_w \sim 492$ |
| 14.8 | 4.86 | MPA |
| 4.4 | — | MiBK |
| 0.2 | — | Benzyldimethylamine |
| 5.7 | 0.35 | Diethylenetriamine-MiBK-diketimine (75% strength in MiBK) |
| 5.0 | 1.54 | N-methylethanolamine |
| 0.9 | — | Propylene glycol phenyl ether |
| | | (B): Crosslinking agent B4 |
| 72.4 | 45.0 | Polyoxybutylene polyisocyanate, $\overline{M}_w \sim 600$, MiBK |
| 19.2 | — | MiBK |
| 13.5 | 15.1 | MiBK-ketoxime |
| 4.8 | 20.0 | Trimethylolpropane |
| 0.1 | — | Dibutyltin laurate |
| | | (C): Crosslinking agent C3 |
| | | Synthetic resin 5 |
| | | (A): Binder 4 |
| | | (B): Crosslinking agent B5 |
| 73.3 | 2.0 | Polyoxypropylene polyisocyanate, $\overline{M}_w \sim 2100$ |
| 12.0 | — | MiBK |
| 8.6 | 1.0 | Ethylhexanol in MiBK |
| 3.8 | 1.0 | BPA |
| 2.2 | — | Butylglycol |
| | | (C): Crosslinking agent C3 |
| | | Synthetic resin 6 |
| | | (A): Binder 4 |
| | | (B): Crosslinking agent B6 |
| 49.1 | 28.0 | Polyoxyethylene polyisocyanate, $\overline{M}_w \sim 600$ |
| 7.0 | — | Toluene |

-continued

| | | |
|---|---|---|
| 3.7 | 70.5 | Dimethylaminopropanol |
| 1.7 | 7.05 | Ethanol |
| 7.7 | 16.0 | Diglycidyl ether based on BPA, EEW = 188 |
| 0.03 | — | Triphenylphosphine |
| 10.8 | — | MiBK |
| 3.7 | 12.0 | Dibutylamine |
| 1.8 | 12.0 | Paraformaldehyde |
| 11.3 | 19.2 | Bisphenol A |
| | | (C): Crosslinking agent C3 |
| | Synthetic resin 7 | |
| | (A): Binder 5 | |
| 5.5 | 2.95 | Diethylenetriamine |
| 7.8 | 1.86 | Dimeric fatty acid, $\overline{M}_w \sim 560$ |
| 1.5 | 1.48 | Linoleic fatty acid, $M_w \sim 280$ |
| 1.6 | — | Xylene |
| 40.8 | 6.0 | Diglycidyl ether based on BPA, EEW $\sim$ 188 |
| 11.2 | 6.75 | BPA |
| 2.7 | — | Propylene glycol phenyl ether |
| 0.015 | — | Triphenylphosphine |
| 23.1 | — | Isobutanol |
| 1.185 | — | Butylglycol |
| 3.7 | — | Methylethanolamine |
| | | (B): Crosslinking agent B4 |
| | | (C): Crosslinking agent C3 |

Synthetic resin 8
  (A): Binder 5
  (B): Crosslinking agent B5
  (C): Crosslinking agent C3
Synthetic resin 9
  (A): Binder 5
  (B): Crosslinking agent B6
  (C): Crosslinking agent C3
Comparative synthetic resin
  (A): Binder 4
  (C): Crosslinking agent C2

Preparation of the components (A)

Binder 1

A mixture of diglycidyl ether, polycaprolactonediol and xylene in the weight ratio stated in each case was heated to 210° C. under nitrogen, water being distilled off azeotropically. Thereafter, the mixture was cooled to 150° C. and the corresponding amounts of bisphenol A and benzyldimethylamine were added. After 1½ hours at 150°–170° C., the reaction mixture was cooled to 110° C. and diethylenetriamine methyl isobutyl diketimine, methylethanolamine and 2-hexyloxyethanol were added in the weight ratio stated in each case. Stirring was continued for a further 1 hour at 110° C.

Binder 2

The diglycidyl ether was dissolved in monoethylene glycol monoethyl ether acetate in the stated weight ratios. After the addition of the corresponding amount of hydroquinone, the half-ester of tetrahydrophthalic acid and ethyl 2-methylpropionate was added in the stated weight ratio and the reaction was carried out at 105°–110° C. to an acid number of <5 mg KOH/g. Thereafter, the mixture was cooled to 60° C. and a 70% strength solution of toluylene diisocyanate, half-blocked with dimethylethanolamine, in ethyl acetate was added. The reaction was carried out at 60°–70° C. to an NCO value of about zero.

Binder 3 a) Preparation of the Amine Intermediate 246 g of hexamethylenediamine, 307 g of dimeric fatty acid, 59 g of linseed oil fatty acid and 31 g of toluene were heated to 190° C. and the resulting water of reaction (57 g) was distilled off azeotropically. Dilution was then effected with 73 g of toluene, and a further 4.1 g of hexamethylenediamine were added. The amine number of the amine intermediate was 249 mg/g.

b) Preparation of the Binder

In a second stirred vessel, 3061 g of the diglycidyl ether based on bisphenol A (EEW-485) were dissolved in 569 g of toluene and 534 g of isobutanol. 135 g of methylethanolamine were added at 55° C. After an epoxide equivalent weight of 835 had been reached, 656 g of the above amine intermediate and 141 g of toluene were added. Stirring was then continued for 2 hours. The binder had a solids content of 70% and a viscosity of 6,200 mPa.s (measured at 23° C. as a 40% strength solution in propylene glycol phenyl ether). The amine number was 91 mg/g.

Binder 4

A mixture of the diglycidyl ether, the bisphenol A/ethylene oxide adduct, bisphenol A and methyl isobutyl ketone in the stated weight ratio was heated to 140° C. under nitrogen. The corresponding amount of benzyldimethylamine was added in 2 portions, an exothermic reaction taking place and causing the reaction temperature to increase to 180° C. Water was distilled off azeotropically. After the end of the water separation, the reaction temperature was kept at 140° C. for 2 hours. Diethylenetriamine methyl isobutyl ketimine as a 75% strength solution in methyl isobutyl ketone and N-methylethanolamine were then added in the course of 30 minutes. After the reaction had been continued for a further hour at from 125° to 130° C., the propylene glycol phenyl ether was stirred in the corresponding weight ratio. A resin having a solids content of 93.2% was obtained.

Binder 5 a) Preparation of the Amine Intermediate

A mixture of 5,150 g of diethylenetriamine, 7,250 g of a dimeric fatty acid, 1,400 g of linseed oil fatty acid and 1,473 g of xylene was slowly heated to 150°–175° C., the resulting water of reaction (539 g) being distilled off. The resulting intermediate had a solids content of 90%, an amine number of 464 mg/g and an acid number of <2 mg/g.

b) Preparation of the Binder

In a second reaction vessel, 11,280 g of the diglycidyl ether based on bisphenol A and epichlorohydrin were heated to 100° C. together with 3,078 g of bisphenol A and 756 g of propylene glycol phenyl ether. After the addition of 4.3 g of triphenylphosphine, the mixture was heated to 130° C. until an epoxide equivalent rate of 435 had been reached. The mixture was cooled to 100° C. and 4,858 g of isobutanol and 540 g of butylglycol were added. The reaction mixture was then cooled to 55° C. and 1,019 g of methylethanolamine were added with thorough external cooling. After an epoxide equivalent weight of 750 had been reached, 4,389 g of an amine intermediate and a mixture of 1,521 g of isobutanol and 169 g of butylglycol were added. The reaction was then continued for a further 2 hours. The binder had a solids content of 70% and a viscosity of 4,800 mPa.s (measured at 23° C. as a 40% strength solution in propylene glycol phenyl ether). The amine number was 145 mg/g.

Preparation of the Components (B)

Crosslinking Agent B1

In a stirred flask, 576 g of polyoxybutylene polyisocyanate having an average NCO functionality of 2 were dissolved in 115 g of diethylene glycol dimethyl ether and the solution was heated to 50° C. A solution of 228 g of bisphenol A and 68 g of toluene was added dropwise to the isocyanate solution at a rate such that the reaction temperature did not exceed 60° C. After the end of the addition, stirring was continued at from 50° to 60° C. until the NCO value of the solution had decreased to 0.0335. Thereafter, 78.8 g of dipropylamine were added dropwise at 60° C. and stirring was continued until the NCO value had decreased to 0. The resulting solution of the crosslinking agent had a solids content of 83% and a viscosity of 3,800 mPa.s at 25° C.

Crosslinking Agent B2 a) Preparation of the Blocking Agent 1,504 g of the diglycidyl ether were heated with 2,192 g of bisphenol A and 1.25 g of triphenylphosphine at 150°–160° C. for 2 hours and then diluted with 2,087 g of methyl isobutyl ketone.

b) Preparation of the Crosslinking Agent 7,162 g of the polyoxypropylene polyisocyanate having an average NCO functionality of 2 were dissolved in 1,432 g of diethylene glycol dimethyl ether and the solution was heated to 50° C. The polyol solution was added dropwise at a rate such that the reaction temperature did not exceed 65° C. After the end of the addition, stirring was continued at from 50 to 60° C. until the NCO value of the solution had decreased to 0.0155. Thereafter, 240 g of dimethylethanolamine were added at 60° C. and stirring was continued at between 60° and 75° C. until the NCO value had decreased to 0. The resulting solution of the crosslinking agent had a solids content of 75.5% and a viscosity of 2,800 mPa.s at 25° C.

Crosslinking Agent B3

748.8 g of a polyoxyethylene polyisocyanate having an average NCO functionality of 2 were dissolved in 150 g of xylene and the solution was heated to 50° C. A solution of 45.6 g of bisphenol A in 20 g of xylene was added dropwise at a rate such that the reaction temperature did not exceed 65° C. After the end of the addition, stirring was continued at from 50° to 60° C. until the NCO value of the solution had decreased to 0.028. Thereafter, 18.7 g of diisobutylamine were added and stirring was continued at from 60° to 75° C. until the NCO value had decreased to 0. The resulting solution of the crosslinking agent had a solids content of 80% and a viscosity of 3,200 mPa.s at 25° C.

Crosslinking Agent B4

13,640 g of the polyoxybutylene polyisocyanate having an average NCO functionality of 2 were dissolved in 2,540 g of methyl isobutyl ketone and the solution was heated to 30° C. 1,740 g of methyl isobutyl ketoxime were added while cooling in the course of 3 hours at a rate such that the reaction temperature did not exceed 55° C. Thereafter, 200 g of methyl isobutyl ketone were added all at once and stirring was continued for 30 minutes at 45° C. 892.5 g of methylolpropane were then added in three equal portions, the reaction temperature being kept at from 40° to 45° C. during the addition of the first portion. Stirring was continued for 30 minutes at 40° C. before the second part was added at a rate such that the reaction temperature was from 47° to 50° C. During the addition of the third portion, cooling was no longer employed and the reaction temperature increased to 57°–58° C. After the addition of 3.65 g of dibutyltin laurate as a catalyst, the reaction temperature increased to 95° C. Stirring was continued at from 70° to 80° C. until the NCO value had decreased to 0. The resulting solution of the crosslinking agent had a solids content of 85% and a viscosity of 2,800 mPa.s at 25° C.

Crosslinking Agent B5

2,180 g of polyoxypropylene polyisocyanate having an average NCO functionality of 2 were dissolved in 360 g of methyl isobutyl ketone and the solution was heated to 45° C. A solution of 135 g of 2-ethylhexanol in 120 g of methyl isobutyl ketone was added sufficiently slowly to ensure that the reaction temperature did not exceed 60° C. After the end of the addition, stirring was continued for 30 minutes at 50° C. A solution of 114 g of bisphenol A in 65 g of butylglycol was then added, the reaction temperature increasing to 75°–78° C. Stirring was continued at from 50° to 60° C. until the NCO value had decreased to 0. The solution of the crosslinking agent had a solids content of 81.5% and a viscosity of 2,500 mPa.s at 25° C.

Crosslinking Agent B6 a) For the Preparation of the Blocking Agent, see Blocking Agent for Crosslinking Agent B2 b) Preparation of the Crosslinking Agent 9,520 g of a polyoxyethylene polyisocyanate having an average NCO functionality of 2 were dissolved in 1,350 g of toluene and reacted with a mixture of 722 g of dimethylaminopropanol and 322 g of ethanol in such a way that the reaction temperature was 50° C. Thereafter, this reaction solution was added dropwise to the solution of the polyol in the course of 90 minutes at a rate such that the reaction temperature did not exceed 90° C. Thereafter, 1,551 g of dibutylamine and 361 g of paraformaldehyde were added and the reaction mixture was stirred for 6 hours at from 90° to 95° C. The water of reaction formed (216 g) was then distilled off under reduced pressure. The resulting solution of the crosslinking agent had a solids content of 84% and a viscosity of 3,800 mPa.s at 25° C.

Preparation of Component (C)

Crosslinking Agent C1

118 g of butylglycol were added to 174 g of an 80:20 isomeric mixture of toluylene 2,4- and 2,6-diisocyanate in 54 g of methyl isobutyl ketone under a nitrogen atmosphere at a rate such that the reaction temperature did not exceed 100° C. After the end of the addition, the reaction was continued for 30 minutes at from 90° to 100° C. 45.7 g of trimethylolpropane were then added in 3 portions, the reaction temperature increasing, the reaction was continued until the isocyanate value had decreased to 0. Dilution was then effected with 30 g of methyl isobutyl ketone, and the resulting solution of the crosslinking agent had a solids content of 80%.

Crosslinking Agent C2

5,042 g of trimerized hexamethylene diisocyanate were dissolved in 3,823 g of methyl isobutyl ketone. 3,881 g of dibutylamine were added dropwise at 70° C. Stirring was continued until the isocyanate value had decreased to about 0. The product had a solids content of 70%.

Crosslinking Agent C3

444.4 g of isophorone diisocyanate were dissolved in 111.1 g of toluene, and 0.44 g of dibutyltin dilaurate were added. The mixture was then heated to 60° C., and a mixture of 91.2 g of bisphenol A, 53.6 g of trimethylpropane, 48.3 g of methyl isobutyl ketone and 48.3 g of toluene were added dropwise in the course of one hour. After a further two hours, the isocyanate value was 10.5%. 258 g of dibutylamine were added dropwise at a rate such that the reaction temperature did not exceed 80° C. After the end of the reaction, the mixture was diluted to a solids content of 70% with 155.2 g of toluene.

Preparation of the Synthetic Resin Dispersions

Synthetic Resin Dispersion 1

1,145 g of binder 1 were thoroughly mixed with 310.9 g of acetic acid. 1,743 g of DE[5)] water were slowly added to the mixture. The volatile solvents were then removed by azeotropic distillation at 40° C. under reduced pressure. The dispersion was then diluted to a solids content of 34% with DE water.

Synthetic Resin Dispersion 2

1,100 g of the self-crosslinking binder 2 were thoroughly mixed with 997 g of crosslinking agent B2 and 65.3 g of acetic acid, after which 1,830 g of DE water was slowly added. The volatile solvents were removed by azeotropic distillation at 40° C. The dispersion was then diluted to a solids content of 37.5% with DE water.

Synthetic Resin Dispersion 3 to 9

General Method

The amounts of binder, crosslinking agent B and crosslinking agent C shown in Table 1 were thoroughly mixed with 16 g of acetic acid. Thereafter, 3,121 g of water was slowly added to the mixture and the volatile solvent was removed by azeotropic distillation under reduced pressure at 40° C. The dispersions thus obtained had a solids content of 24.5%.

TABLE 1

| Synthetic resin dispersion No. | Binder No./[g] | Crosslinking agent No./[g] | Crosslinking agent No./[g] |
| --- | --- | --- | --- |
| 3 | 3/511 | B3/391 | C2/2984 |
| 4 | 4/420.8 | B4/160.2 | C3/194.5 |
| 5 | 5/420.8 | B5/167.2 | C3/194.5 |
| 6 | 4/420.8 | B6/162.2 | C3/194.5 |

TABLE 1-continued

| Synthetic resin dispersion No. | Binder No./[g] | Crosslinking agent No./[g] | Crosslinking agent No./[g] |
| --- | --- | --- | --- |
| 7 | 5/429.6 | B4/160.2 | C3/194.5 |
| 8 | 5/429.6 | B5/167.2 | C3/194.5 |
| 9 | 5/429.6 | B6/162.2 | C3/194.5 |

Comparative synthetic resin
(A): Binder 4
(C): Crosslinking agent C2
Comparative synthetic resin dispersion
43% of binder 4 and 20% of crosslinking agent C2.

Component (D)

Pigment Formulation 640 g of a diglycidyl ether based on bisphenol A and epichlorohydrin and having an epoxide equivalent weight of 485 and 160 g of a diglycidyl ether based on bisphenol A and epichlorohydrin and having an epoxide equivalent weight of 188 were mixed at 100° C. 452 g of hexamethylenediamine were initially taken in a second vessel and heated to 100° C., and 720 g of the above epoxy resin mixture were added in the course of one hour, it being necessary to cool slightly in order to keep the temperature at 100° C. After a further 30 minutes, the excess hexamethylenediamine was stripped off under reduced pressure and with an increasing temperature, 205° C. and 30 mbar being reached toward the end of the distillation. 57.6 g of stearic acid, 172.7 g of a dimeric fatty acid and 115 g of xylene were then added. The water of reaction formed was then distilled off azeotropically in the course of 90 minutes at 175° to 180° C. Dilution was then effected with 58 g of butylglycol and 322 g of isobutanol. The product had a solids content of 70% and a viscosity of 2,240 mPa.s, measured at 75° C. using a plate-and-cone viscometer.

110 g of the resulting resin having surfactant properties were milled in a ball mill with 36 g of ethylene glycol monobutyl ether, 3 g of acetic acid, 117 g of titanium dioxide, 18 g of lead silicate, 4.5 g of carbon black and 170 g of water to a particle size of <7 μm.

Electrocoating Baths

The pigment formulation was added to each of the novel synthetic resin dispersions 1 to 9 and to the comparative dispersion in an amount such that the weight ratios of components (A) (binders) to component (D) (pigment formulation) were 2:1. The solids content of the bath was brought to 20% in each case with water, a bath volume of 5 l being obtained in each case. The electrocoating baths were stirred for 7 days at 30° C. Synthetic resin films having a thickness of from 22 to 24 μm were deposited in the course of 2 minutes at from 150 to 500 V and at a bath temperature of 27° C. onto 190×150 mm test panels of zinc-phosphatized steel sheet which had been made the cathode. The synthetic resin films were then baked at 160° C. in the course of 20 minutes.

The compositions of the baths and the test results are listed in Table 2.

TABLE 2

| Electrocoating bath No. | (A) Binder No./% by weight | (B) Crosslinking agent No./% by weight | (C) Crosslinking agent No./% by weight | (D) Pigment formulation % by weight | EC [mm] | RI [in * pd] | SST [mm] | CCT [mm] |
|---|---|---|---|---|---|---|---|---|
| Novel | | | | | | | | |
| 1 | 1/43 | B1/12 | C1/8 | 37 | 7.9 | 120 | 1.13 | 0.41 |
| 2 | 2/43 | B2/20 | — | 37 | 8.2 | 140 | 1.76 | 0.63 |
| 3 | 3/43 | B3/5 | C2/15 | 37 | 7.3 | 80 | 2.49 | 0.64 |
| 4 | 4/43 | B4/10 | C3/10 | 37 | 7.5 | 160 | 1.14 | 0.57 |
| 5 | 4/43 | B5/10 | C3/10 | 37 | 8.9 | >160 | 2.05 | 0.62 |
| 6 | 4/43 | B6/10 | C3/10 | 37 | 6.2 | 80 | 0.79 | 0.43 |
| 7 | 5/43 | B4/10 | C3/10 | 37 | 6.9 | 120 | 1.05 | 0.55 |
| 8 | 5/43 | B5/10 | C3/10 | 37 | 7.6 | 160 | 1.44 | 0.78 |
| 9 | 5/43 | B6/10 | C3/10 | 37 | 7.1 | 140 | 0.51 | 0.41 |
| Comparison | | | | | | | | |
| 1V | VK/43 | — | C2/20 | 37 | 3.8 | <10 | 2.39 | 1.32 |

EC: Erichsen cupping
RI: Reverse impact, determined using a mandrel impact tester from Gardner according to ASTM D 2794
SST: Salt spray test for 480 hours on bright sheet metal, undermigration in mm according to DIN 50,021
CCT: Climate cycling test, 10 cycles, undermigration in mm, according to VDA 621-415

We claim:

1. A synthetic resin containing, as essential components,
   A) a crosslinkable binder selected from the group consisting of the polymers, polyadducts or polycondensates having reactive centers in the form of hydroxyl, thio or primary or secondary amino groups,
   B) a crosslinking agent based on a polyoxyalkylene polyisocyanate of the general formula I

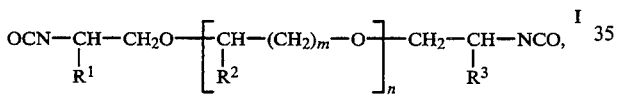

$$\text{OCN}-\underset{R^1}{\text{CH}}-\text{CH}_2\text{O}-\left[\underset{R^2}{\text{CH}}-(\text{CH}_2)_m-\text{O}\right]_n-\text{CH}_2-\underset{R^3}{\text{CH}}-\text{NCO,} \quad I$$

where $R^1$ to $R^3$ may be identical or different and are each hydrogen or $C_1$–$C_6$-alkyl, m is from 1 to 10 and n is from 1 to 50, and
   C) a crosslinking agent which differs from (B) and is based on
      $\gamma_1$) a polyfunctional isocyanate which differs from (B) or
      $\gamma_2$) an organic compound which reacts at elevated temperatures with free amino groups of component (A) with amide formation or
      $\gamma_3$) an organic compound which reacts at elevated temperatures with hydroxyl groups of component (A) with transesterification or
      $\gamma_4$) a phenolic Mannich base or
   a mixture of two or more crosslinking agents ($\gamma_1$) to ($\gamma_4$).

2. A synthetic resin as claimed in claim 1, wherein the crosslinkable binder selected from the group consisting of the polymers, polyadducts or polycondensates having reactive centers in the form of hydroxyl, thio or primary or secondary amino groups is
   $a_1$) a polyester or
   $a_2$) an alkyd resin or
   $a_3$) a polyether or
   $a_4$) a polyacrylate or
   $a_5$) a polyurethane or
   $a_6$) an epoxy resin or
a mixture of two or more binders ($a_1$) to ($a_5$).

3. A synthetic resin as claimed in claim 1, essentially containing

A) from 50 to 95% by weight of a crosslinkable binder based on an epoxy resin, obtainable from
      $\alpha_1$) a diglycidyl ether based on a polyhydric phenol which has an average molecular weight $M_w$ of from 200 to 5,000 and contains on average from 1.5 to 3.0 epoxy groups per molecule and
      $\alpha_2$) at least one amine selected from the group consisting of
         $\alpha_{2.1}$) primary $C_2$–$C_{20}$-alkyldiamines,
         $\alpha_{2.2}$) secondary di-$C_1$–$C_{20}$-alkylmonoamines,
         $\alpha_{2.3}$) $C_1$–$C_{20}$-alkyl- $C_1$–$C_{20}$-alkanolamines,
         $\alpha_{2.4}$) polyoxyalkylenepolyamines,
         $\alpha_{2.5}$) polyamines of polyolefins and
         $\alpha_{2.6}$) $C_1$–$C_{20}$-alkylamines which contain secondary and blocked primary amino groups, and
   B) from 5 to 50% by weight of a crosslinking agent based on at least one polyoxyalkylene polyisocyanate selected from the group consisting of
      $b_1$) polyoxyethylene polyisoycyanate
      $b_2$) polyoxypropylene polyisocyanate
      $b_3$) polyoxybutylene polyisocyanate,
   C) from 5 to 50% by weight of a crosslinking agent which differs from (B) and is based on
      $\gamma_1$) a polyfunctional isocyanate which differs from (B) or
      $\gamma_2$) an organic compound which reacts at elevated temperatures with free amino groups of component (A) with amide formation or
      $\gamma_3$) an organic compound which reacts at elevated temperatures with hydroxyl groups of component (A) with transesterification or
      $\gamma_4$) a phenolic Mannich base or
   a mixture of two or more crosslinking agents ($\gamma_1$) to ($\gamma_4$),
   D) from 0 to 30% by weight of a pigment formulation of one or more pigments and a resin having surfactant properties and
   E) from 0 to 10% by weight of additives.

4. A synthetic resin as claimed in claim 1, wherein the polyoxyalkylene polyisocyanate is blocked.

5. A synthetic resin as claimed in claim 1, wherein the polyoxyalkylene polyisocyanate is blocked with at least one blocking agent selected from the group consisting of
   $\beta_1$) a ketoxime,
   $\beta_2$) a polyhydric aliphatic alcohol and $\beta_3$) an aromatic polyol.

6. A synthetic resin as claimed in claim 1, wherein the ketoxime is methyl isobutyl ketoxime.

7. An aqueous dispersion containing from 10 to 40% by weight of a synthetic resin as claimed in claim 1.

8. An electrocoating bath containing an aqueous dispersion as claimed in claim 7.

9. An article coated by cathodic electrocoating and obtainable using an aqueous dispersion as claimed in claim 7.

10. A synthetic resin as defined in claim 1, wherein component (C) is $\gamma_1$.

* * * * *

UNITED STATES PATENT AND TRADEMARK OFFICE
CERTIFICATE OF CORRECTION

PATENT NO.: 5,350,636

DATED: September 27, 1994

INVENTOR(S): HUEMKE et al.

It is certified that error appears in the above-identified patent and that said Letters Patent is hereby corrected as shown below:

IN THE CLAIMS

Column 16, claim 3, line 41,

"polyisoycyanate" should read -- polyisocyanate --

Signed and Sealed this

Twentieth Day of December, 1994

*Attest:*

BRUCE LEHMAN

*Attesting Officer*   Commissioner of Patents and Trademarks